United States Patent
Hosokawa et al.

(10) Patent No.: US 9,250,455 B2
(45) Date of Patent: Feb. 2, 2016

(54) OPTICAL MODULATOR

(71) Applicants: Sumitomo Osaka Cement Co., Ltd., Chiyoda-ku, Tokyo (JP); National Institute of Information and Communications Technology, Koganei-shi, Tokyo (JP)

(72) Inventors: Youichi Hosokawa, Tokyo (JP); Kaoru Higuma, Tokyo (JP); Tetsuya Kawanishi, Koganei (JP); Atsushi Kanno, Koganei (JP)

(73) Assignees: SUMITOMO OSAKA CEMENT CO., LTD., Chiyoda-ku, Tokyo (JP); NATIONAL INSTITUTE OF INFORMATION AND COMMUNICATIONS TECHNOLOGY, Koganei-shi, Tokyo (JP)

( * ) Notice: Subject to any disclaimer, the term of this patent is extended or adjusted under 35 U.S.C. 154(b) by 266 days.

(21) Appl. No.: 13/754,183

(22) Filed: Jan. 30, 2013

(65) Prior Publication Data

US 2013/0195394 A1      Aug. 1, 2013

(30) Foreign Application Priority Data

Jan. 31, 2012   (JP) ................................. 2012-017673

(51) Int. Cl.
*G02F 1/035*   (2006.01)
*G02F 1/01*    (2006.01)
(Continued)

(52) U.S. Cl.
CPC .............. *G02F 1/035* (2013.01); *G02F 1/0123* (2013.01); *G02F 1/225* (2013.01); *H04B 10/5053* (2013.01); *H04B 10/541* (2013.01); *G02F 2201/18* (2013.01)

(58) Field of Classification Search
None
See application file for complete search history.

(56) References Cited

U.S. PATENT DOCUMENTS 5,168,534 A * 12/1992 McBrien et al. .................. 385/3
6,278,539 B1    8/2001 Ooi et al.
(Continued)

FOREIGN PATENT DOCUMENTS

| JP | 3723358 B2 | 9/2005 |
|----|------------|--------|
| JP | 2008-089936 A | 4/2008 |

(Continued)

OTHER PUBLICATIONS

H. Kawakami, et al., "Auto Bias Control Technique for Optical 16-QAM Transmitter With Asymmetric Bias Dithering", Optical Communication) ECOC), 2011 37th European Conference and Exhibition on Sep. 18, 2011, pp. 1-3.

*Primary Examiner* — Tina Wong
(74) *Attorney, Agent, or Firm* — Taft Stettinius & Hollister LLP

(57) ABSTRACT

The optical modulator includes optical modulation units. The plurality of optical modulation units is disposed in parallel on the same substrate. One input waveguide branches off to be connected to the Mach-Zehnder type optical waveguide of each optical modulation unit, and an entire optical waveguide is formed such that outputs from the Mach-Zehnder type optical waveguides are combined and output through one output waveguide. A modulation signal with the same intensity is applied to a modulation electrode of each optical modulation unit. In at least some of the optical modulation units, mechanical structures including the modulation electrodes of the optical modulation units are configured such that an amplitude value of an optical output modulated by the modulation signal of the optical modulation unit is ½ⁿ (n is a natural number) of a maximum amplitude value in other optical modulation units.

9 Claims, 10 Drawing Sheets

(51) Int. Cl.
  *G02F 1/225* (2006.01)
  *H04B 10/50* (2013.01)
  *H04B 10/54* (2013.01)

(56) References Cited

U.S. PATENT DOCUMENTS

2001/0007508 A1    7/2001   Ooi et al.
2009/0244685 A1   10/2009   Hoshida et al.
2009/0279825 A1 * 11/2009   Kawanishi et al. ............... 385/2
2009/0290829 A1   11/2009   Kuratani et al.
2009/0324156 A1   12/2009   Kimpara et al.
2010/0202785 A1    8/2010   Kawanishi et al.

FOREIGN PATENT DOCUMENTS

JP     2009-94988 A       4/2009
JP     2009-244682 A     10/2009
WO    WO2006/107000 A1   10/2006
WO    WO2008/090685 A1    7/2008

* cited by examiner

OPTICAL MODULATOR

TECHNICAL FIELD

Priority is hereby claimed to Japan Patent Application No. 2012-017673 filed on Jan. 31, 2012, and such priority application is hereby incorporated by reference herein, in its entirety. The present invention relates to an optical modulator and in particular, to an optical modulator operable in a quadrature amplitude modulation (QAM) format (including a multiplexing method using polarization multiplexing and the like) of $2^n$ values (n is a natural number).

BACKGROUND ART

In optical communication technology, in order to increase the information density, an optical modulator based on a multi-level modulation scheme of 16-QAM or higher is under development.

As shown in PTL 1 or PTL 2, in a modulator having a configuration in which quadrature phase-shift keying (QPSK) structures are disposed in a nested structure, it is possible to generate an amplitude-shift keying (ASK) signal or a QAM signal by generating binary phase-shift keying (BPSK) signals, which are adjusted to have an appropriate light intensity ratio and an appropriate phase, and combining the binary phase-shift keying (BPSK) signals.

For example, in a structure shown in FIG. 10, when the amplitude ratio of the optical outputs from an optical modulation unit including a Mach-Zehnder type optical waveguide MZ1 and an optical modulation unit including a Mach-Zehnder type optical waveguide MZ2 is 2:1 and the phase difference is 0 or π, it is possible to generate the four-level ASK signal. In addition, when the amplitude ratio of the optical outputs from the MZ1 and the MZ2 in the structure shown in FIG. 11 is 1:1 and the phase difference is ±π/2, it is possible to generate the QPSK signal.

Specifically, by providing a light intensity adjusting unit for the waveguides of one QPSK structure as shown in FIG. 1, the output amplitude ratio of the QPSK signals is set to 2:1. In addition, the phase difference between the output light components from Mach-Zehnder type optical waveguides (MZ optical waveguides) in each QPSK structure is set to ±π/2, and the phase difference between the output light components from each of the QPSK structures is set to 0 or π. In FIG. 1, the points displayed with the X-Y coordinates schematically show signal states obtained by the output light from each Mach-Zehnder type optical waveguide or a combining section of optical waveguides.

In order to generate 16-QAM signals, as shown in FIG. 1, at least four MZ optical waveguides are required, and it is necessary to combine their outputs. Accordingly, the element itself becomes large even in the basic structure.

In addition, since it is necessary to make the amplitude ratio of the optical outputs from the MZ optical waveguides constant, a light intensity adjusting unit is required. As the light intensity adjusting mechanism, additional elements, such as an attenuator, MZ optical waveguide for intensity modulation, are used. However, these cause an increase in the size of the entire element.

As one of the light intensity adjusting unit, means for making the branching ratio in a branching portion of the optical waveguide asymmetrical may be considered. However, there are disadvantages in that the means is easily influenced by manufacturing deviations and the like. In addition, it is also possible to consider means for adjusting the light intensity by adjusting the amplitude ratio of input RF signals (modulation signals) in an external circuit. In this case, the number of adjustment sections for RF signal control is increased.

On the other hand, in the bias adjustment or the like of the BPSK signal in a conventional example, as shown in PTL 3 or FIG. 5, the bias point is a bottom of the modulation curve, the input amplitude is set to $2V\pi$ ($V\pi$ is a half-wave voltage of the modulation curve), and a low-frequency dither signal with a frequency f is superimposed on the signal input. In the bias adjustment, for the optical output, a point at which the component with a frequency 2f is greatest is set as the bias point. In addition, the branched light of the optical output is used for detection, separated for each frequency using a band pass filter or the like. Each separated optical output is detected by a photodetection device, such as a photodetector (PD).

Since a plurality of optical modulation units, each of which is formed by one MZ type optical waveguide, are present, the two following methods may be considered in the selection of the dither signal applied to each optical modulation unit.

(1) Dither signals with the same frequency are applied to respective optical modulation units in a time-sharing manner.

(2) Dither signals with different frequencies are simultaneously applied to respective optical modulation units.

Since there need few frequencies used in the above (1), it is possible to set a narrow detection band. However, since the bias voltages of the optical modulation units are adjusted one by one, the bias points of other optical modulation units are drifted for the period. As a result, resistance to the bias drift becomes weak.

In the above (2), since a plurality of optical modulation units can be simultaneously adjusted, resistance to the bias drift becomes strong. However, it is necessary to detect a plurality of frequencies. For the control of the QAM signal, it is thought that the measures against drift are important. In general, therefore, the method in the above (2) with less time loss is preferable.

In the case of the above (2), however, a problem of the selection of dither signal frequencies occurs. That is, when selecting different frequencies of dither signals applied to the respective optical modulation units, the frequencies should be selected such that any frequency does not become twice the other frequencies. For example, assuming that the dither signal frequency used in a certain optical modulation unit is f, it is necessary to select frequencies other than the frequency of 2f or f/2 in other optical modulation units. Due to such frequency limitations, frequency selection of the dither signal is difficult in the QAM modulator with a large number of optical modulation units that are controlled.

In addition, as one of the methods to solve the above-described problem of the selection of dither signal frequencies, a method using a plurality of photodetectors (PD) for bias adjustment may be considered as shown in FIG. 6 or 7. In FIG. 6, a photodetector (PD) is disposed for each QPSK structure in which two optical modulation units having MZ type optical waveguides are disposed in parallel. FIG. 7 is a configuration in which one photodetector (PD) is attached to each optical modulation unit having one MZ type optical waveguide. In particular, in the case of the configuration shown in FIG. 7, it is also possible to use dither signals with the same frequency in bias control of a plurality of optical modulation units. However, space for attaching the photodetector (PD) is required, and electric wirings for routing the current output of light detection elements are complicated since the photodetectors are disposed away from each other.

CITATION LIST

Patent Literature

[PTL 1] Japanese Laid-open Patent Publication No. 2009-94988
[PTL 2] Japanese Laid-open Patent Publication No. 2009-244682
[PTL 3] Japanese Patent No. 3723358

SUMMARY OF INVENTION

Technical Problem

In order to solve the above-described problems, it is an object of the present invention to provide an optical modulator that includes a plurality of optical modulation units having MZ type optical waveguides and can easily adjust the light intensity ratio even if the optical modulator is operable in the QAM format of $2^n$ values (n is a natural number). In addition, it is an object of the present invention to provide an optical modulator capable of suppressing the number of frequencies of the dither signal applied to the optical modulation units in bias control of each optical modulation unit.

Solution to Problem

In order to solve the above-described problem, the first aspect of the present invention includes an optical modulation unit having a Mach-Zehnder type optical waveguide and a modulation electrode for modulating light waves propagating through the Mach-Zehnder type optical waveguide. The entire optical waveguide is formed such that the plurality of optical modulation units is disposed in parallel on the same substrate. One input waveguide branches off to be connected to the Mach-Zehnder type optical waveguide of each optical modulation unit, and outputs from the Mach-Zehnder type optical waveguides are combined and output through one output waveguide. A modulation signal with a same intensity is applied to a modulation electrode of each optical modulation unit. In at least some of the optical modulation units, mechanical structures including the modulation electrode of the optical modulation units are configured such that an amplitude value of an optical output modulated by the modulation signal of the optical modulation unit is ½n (n is a natural number) of a maximum amplitude value in other optical modulation units at which the amplitude value of the optical output modulated by the modulation signals is the greatest.

According to the second aspect of the present invention, in the optical modulator related to the first aspect of the present invention, the mechanical structure of the optical modulation unit is configured such that a length ratio of the modulation electrode is $\{\cos^{-1}(1-2^{1-n})\}/\pi$ (n is a natural number) compared with those of other optical modulation units.

According to the third aspect of the present invention, in the optical modulator related to the first aspect of the present invention, the mechanical structures of the optical modulation unit are configured by adjusting a depth of a ridge that forms an optical waveguide, a width of a signal electrode that forms a modulation electrode, a gap between a signal electrode and a ground electrode, positional relationship between a modulation electrode and an optical waveguide, a width of an optical waveguide, a polarization inversion structure, a thickness of a substrate, or an dielectric constant under a substrate for each optical modulation unit.

According to the fourth aspect of the present invention, in the optical modulator related to any one of the first to the third aspects of the present invention, four optical modulation units are disposed in parallel to form a QAM structure having a nested structure. Two Mach-Zehnder type optical waveguides are disposed in a nested structure. Two QPSK structures, each of which is configured such that optical outputs from the respective Mach-Zehnder type optical waveguides are combined so as to have a phase difference of $\pm\pi/2$, are disposed in parallel. A ratio between a half-wave voltage in each optical modulation unit within a first QPSK structure and a half-wave voltage in each optical modulation unit within a second QPSK structure is 1:2, an amplitude ratio of optical outputs between the first and second QPSK structures is 2:1. A 16-QAM optical signal is generated by combining optical outputs from the two QPSK structures so as to have a phase difference of 0 or $\pi$.

According to the fifth aspect of the present invention, in the optical modulator related to any one of the first to the third aspects of the present invention, four optical modulation units are disposed in parallel to form a QAM structure having a nested structure. Two Mach-Zehnder type optical waveguides between which a ratio of half-wave voltages is 1:2 are disposed in a nested structure. An amplitude ratio of optical outputs from two Mach-Zehnder type optical waveguides is 2:1. Two ASK structures, each of which is configured such that the optical outputs from the two Mach-Zehnder type optical waveguides are combined so as to have a phase difference of 0 or $\pi$, are disposed in parallel. A 16-QAM optical signal is generated by combining optical outputs from the two ASK structures so as to have a phase difference of $\pm\pi/2$.

According to the sixth aspect of the present invention, in the optical modulator related to any one of the first to the third aspects of the present invention, four optical modulation units are disposed in parallel to form a QAM structure having a nested structure. Two Mach-Zehnder type optical waveguides between which a ratio of half-wave voltages is 1:2 are disposed in a nested structure. An amplitude ratio of optical outputs from two Mach-Zehnder type optical waveguides is 2:1. Two structures, each of which is configured such that the optical outputs from the two Mach-Zehnder type optical waveguides are combined so as to have a phase difference of $\pm\pi/2$, are disposed in parallel. A 16-QAM optical signal is generated by combining optical outputs from the two structures so as to have a phase difference of $\pm\pi/2$.

According to the seventh aspect of the present invention, in the optical modulator related to any one of the first to the sixth aspects of the present invention, dither signals with a same frequency f are input to two of the optical modulation units having the different mechanical structures. A bias voltage of each of the two optical modulation units is controlled. A ratio of half-wave voltages between the two optical modulation units is 1:2. In the former optical modulation unit of the above ratio, the bias voltage of the optical modulation unit is controlled by using a component of a frequency 2f included in an output light or a radiation light from the optical modulation unit. In the latter optical modulation unit of the above ratio, a bias voltage of the optical modulation unit is controlled by using a component of the frequency f included in an output light or a radiation light from the optical modulation unit.

According to the eighth aspect of the present invention, in the optical modulator related to any one of the first to the third aspects of the present invention, the optical modulation unit is an optical modulation unit in which an amplitude ratio of each optical output is $½^0:½^1:\ldots:½^n$ (n is a natural number) when a ratio of each half-wave voltage is $[\pi/\{\cos^{-1}(1-2^{1-0})\}]:[\pi/\{\cos^{-1}(1-2^{1-1})\}]:\ldots:[\pi/\{\cos^{-1}(1-2^{1-n})\}]$.

A structure is adopted in which "2(n+1)" optical modulation units having the same half-wave voltage are disposed in parallel two by two. "$4^{n+1}$" QAM optical signals are generated by adopting a configuration in which a phase difference between optical outputs from optical modulation units having the same half-wave voltage is $\pm\pi/2$ and a phase difference between optical outputs from optical modulation units having different half-wave voltages is $\pi/2 \times m$ (m is an integer).

According to the ninth aspect of the present invention, in the optical modulator related to any one of the first to the third and the eighth aspects of the present invention, dither signals with a same frequency f are input to two of the optical modulation units having the different mechanical structures. A bias voltage of each of the two optical modulation units is controlled. A ratio of half-wave voltages between the two optical modulation units is 1:x (x≥1). In the former optical modulation unit of the above ratio, an amplitude of an input signal to the optical modulation unit is twice the half-wave voltage, and the bias voltage of the optical modulation unit is controlled by using a component of a frequency 2f included in an output light or a radiation light from the optical modulation unit. In the latter optical modulation unit of the above ratio, the bias voltage of the optical modulation unit is controlled by using a component of a frequency f included in an output light or a radiation light from the optical modulation unit.

Advantageous Effects of Invention

According to the first aspect of the present invention, an optical modulation unit is provided which includes a Mach-Zehnder type optical waveguide and a modulation electrode for modulating light waves propagating through the Mach-Zehnder type optical waveguide. The entire optical waveguide is formed such that the plurality of optical modulation units is disposed in parallel on the same substrate. One input waveguide branches off to be connected to the Mach-Zehnder type optical waveguide of each optical modulation unit, and outputs from the Mach-Zehnder type optical waveguides are combined and output through one output waveguide. A modulation signal with a same intensity is applied to a modulation electrode of each optical modulation unit. In at least some of the optical modulation units, mechanical structures including the modulation electrodes of the optical modulation unit are configured such that an amplitude value of an optical output modulated by the modulation signal of the optical modulation unit is $\frac{1}{2}n$ (n is a natural number) of a maximum amplitude value in other optical modulation units at which an amplitude value of the optical output modulated by the modulation signals is the greatest. Therefore, it is possible to easily adjust the light intensity ratio in the optical modulator. In particular, a light intensity adjusting mechanism such as an attenuator, adjusting the branching ratio in a branching portion of an optical waveguide, adjusting the amplitude ratio of modulation signals in an external circuit, and the like are not necessary unlike in the related art. For this reason, since there needs no addition of a new component, miniaturization or integration of elements can be realized. As a result, since it becomes less influenced by manufacturing variations, a stable yield can be expected. In addition, since the amplitude of an RF signal input to the optical modulator can be constant, an adjustment point on the input signal is not necessary.

According to the second aspect of the present invention, since the mechanical structure of the optical modulation unit is configured such that a length of the modulation electrode is $\{\cos^{-1}(1-2^{1-n})\}/\pi$ (n is a natural number) compared with those of other optical modulation units, it is possible to easily adjust the light intensity ratio just by adjusting the shape of the modulation electrode at the time of manufacturing.

According to the third aspect of the present invention, since the mechanical structures of the optical modulation unit are configured by adjusting a depth of a ridge that forms an optical waveguide, a width of a signal electrode that forms a modulation electrode, a gap between a signal electrode and a ground electrode, positional relationship between a modulation electrode and an optical waveguide, a width of an optical waveguide, a polarization inversion structure, a thickness of a substrate, or an dielectric constant under a substrate for each optical modulation unit, it is possible to easily adjust the intensity ratio just by adjusting the shape and arrangement of the optical waveguide or the modulation electrode when manufacturing the optical modulator.

According to the fourth aspect of the present invention, four optical modulation units are disposed in parallel to form a QAM structure having a nested structure. Two Mach-Zehnder type optical waveguides are disposed in a nested structure. Two QPSK structures, each of which is configured such that optical outputs from the respective Mach-Zehnder type optical waveguides are combined so as to have a phase difference of $\pm\pi/2$, are disposed in parallel. A ratio between a half-wave voltage in each optical modulation unit within a first QPSK structure and a half-wave voltage in each optical modulation unit within a second QPSK structure is 1:2, an amplitude ratio of optical outputs between the first and second QPSK structures is 2:1. A 16-QAM optical signal is generated by combining optical outputs from the two QPSK structures so as to have a phase difference of 0 or $\pi$. Therefore, it is possible to provide an optical modulator capable of easily adjusting the light intensity ratio in the optical modulator, especially, a 16-QAM modulator.

According to the fifth aspect of the present invention, four optical modulation units are disposed in parallel to form a QAM structure having a nested structure. Two Mach-Zehnder type optical waveguides between which a ratio of half-wave voltages is 1:2 are disposed in a nested structure. An amplitude ratio of optical outputs from two Mach-Zehnder type optical waveguides is 2:1. Two ASK structures, each of which is configured such that the optical outputs from the two Mach-Zehnder type optical waveguides are combined so as to have a phase difference of 0 or $\pi$, are disposed in parallel. A 16-QAM optical signal is generated by combining optical outputs from the two ASK structures so as to have a phase difference of $\pm\pi/2$. Therefore, it is possible to provide an optical modulator capable of easily adjusting the light intensity ratio in the optical modulator, especially, a 16-QAM modulator.

According to the sixth aspect of the present invention, four optical modulation units are disposed in parallel to form a QAM structure having a nested structure. Two Mach-Zehnder type optical waveguides between which a ratio of half-wave voltages is 1:2 are disposed in a nested structure. An amplitude ratio of optical outputs from two Mach-Zehnder type optical waveguides is 2:1. Two structures, each of which is configured such that the optical outputs from the two Mach-Zehnder type optical waveguides are combined so as to have a phase difference of $\pm\pi/2$, are disposed in parallel. A 16-QAM optical signal is generated by combining optical outputs from the two structures so as to have a phase difference of $\pm\pi/$. Therefore, it is possible to provide an optical modulator capable of generating 16-QAM optical signals, especially, a 16-QAM modulator.

According to the seventh aspect of the present invention, dither signals with a same frequency f are input to two of the optical modulation units having the different mechanical structures. A bias voltage of each of the two optical modulation units is controlled. A ratio of half-wave voltages between the two optical modulation units is 1:2. In the former optical modulation unit of the above ratio, the bias voltage of the optical modulation unit is controlled by using a component of a frequency 2f included in an output light or a radiation light from the optical modulation unit. In the latter optical modulation unit of the above ratio, a bias voltage of the optical modulation unit is controlled by using a component of the frequency f included in an output light or a radiation light from the optical modulation unit. Therefore, it is possible to perform bias control of all optical modulation units simultaneously with the number of the frequency f that is at least half the number of optical modulation units or less.

According to the eighth aspect of the present invention, the optical modulation unit is an optical modulation unit in which an amplitude ratio of each optical output is $\frac{1}{2}^0:\frac{1}{2}^1:\ldots:\frac{1}{2}^n$ (n is a natural number) when a ratio of each half-wave voltage is $[\pi/\{\cos^{-1}(1-2^{1-0})\}]:[\pi/\{\cos^{-1}(1-2^{1-1})\}]:\ldots:[\pi/\{\cos^{-1}(1-2^{1-n})\}]$.

A structure is adopted in which "2(n+1)" optical modulation units having the same half-wave voltage are disposed in parallel two by two. "$4^{n+1}$" QAM optical signals are generated by adopting a configuration in which a phase difference between optical outputs from optical modulation units having the same half-wave voltage is $\pm\pi/2$ and a phase difference between optical outputs from optical modulation units having different half-wave voltages is $\pi/2\times m$ (m is an integer). Therefore, it is possible to provide an optical modulator capable of easily adjusting the light intensity ratio in the optical modulator, especially, a $4^{n+1}$-QAM modulator.

According to the ninth aspect of the present invention, dither signals with a same frequency f are input to two of the optical modulation units having the different mechanical structures. A bias voltage of each of the two optical modulation units is controlled. A ratio of half-wave voltages between the two optical modulation units is 1:x (x≥1). In the former optical modulation unit of the above ratio, an amplitude of an input signal to the optical modulation unit is twice the half-wave voltage, and the bias voltage of the optical modulation unit is controlled by using a component of a frequency 2f included in an output light or a radiation light from the optical modulation unit. In the latter optical modulation unit of the above ratio, the bias voltage of the optical modulation unit is controlled by using a component of a frequency f included in an output light or a radiation light from the optical modulation unit. Therefore, it is possible to control the bias voltage of all optical modulation units simultaneously with the number of the frequency f that is less than the number of optical modulation units.

BRIEF DESCRIPTION OF DRAWINGS

FIG. 2 is a diagram illustrating an example using two QPSK structures.

FIG. 3 is a diagram illustrating an example using two ASK structures.

DESCRIPTION OF EMBODIMENTS

Figure 1:
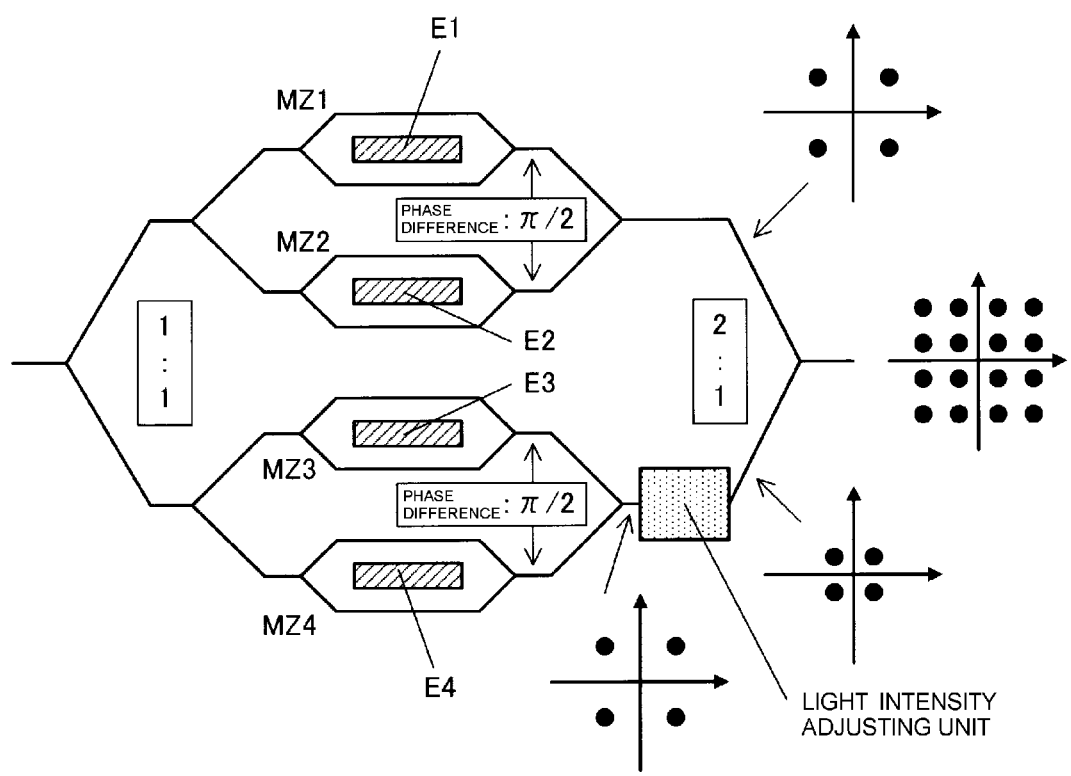
FIG. 1 is a diagram showing the outline of an optical modulator for 16-QAM format in the related art.
Figure 2:
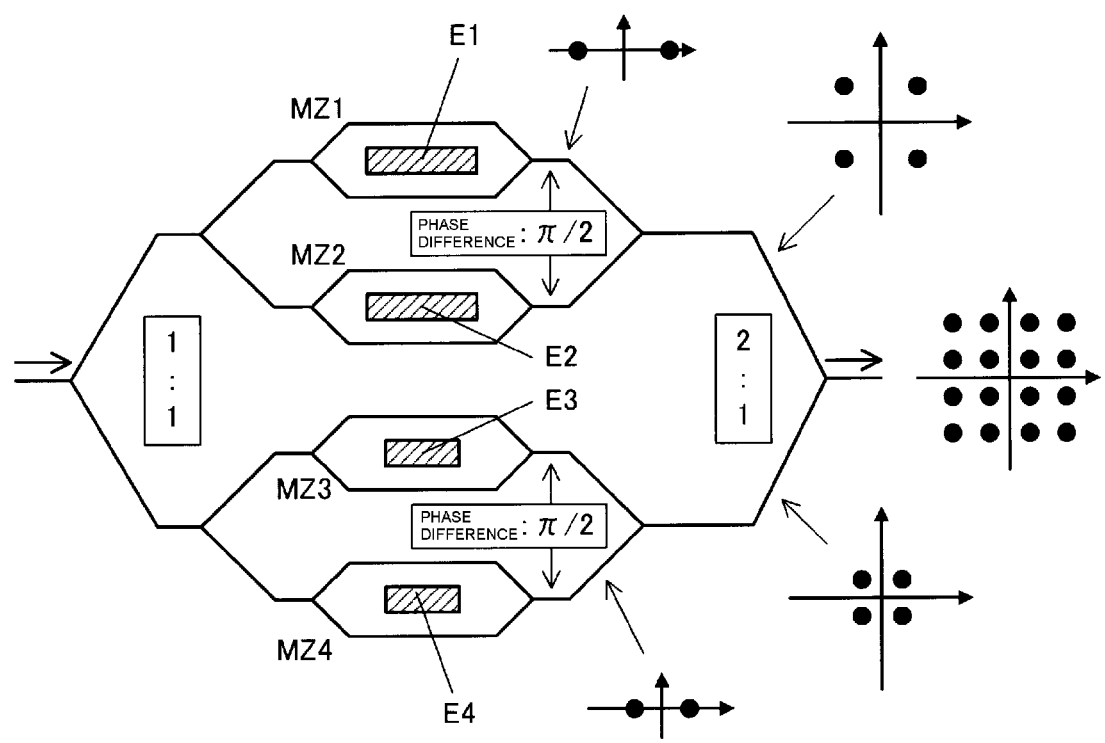
FIG. 2 is a diagram showing the outline of an optical modulator of the present invention. In particular.

Hereinafter, an optical modulator of the present invention will be described in detail. As shown in FIG. 2, the optical modulator of the present invention includes optical modulation units having Mach-Zehnder type optical waveguides (MZ1 to MZ4) and modulation electrodes (E1 to E4) for modulating light waves propagating through the Mach-Zehnder type optical waveguides. In the optical modulator, a plurality of optical modulation units are disposed in parallel on the same substrate, and one input waveguide branches off to be connected to the Mach-Zehnder type optical waveguide of each optical modulation unit and the entire optical waveguide is formed such that outputs from the Mach-Zehnder type optical waveguides are combined and output through one output waveguide. A modulation signal with the same intensity is applied to the modulation electrode of each optical modulation unit. In at least some optical modulation units, mechanical structures including the modulation electrodes of the optical modulation units are set such that the amplitude value of the optical output modulated by the modulation signal of the optical modulation unit is ½n (n is a natural number) of the maximum amplitude value in other optical modulation units at which the amplitude value of the optical output modulated by the modulation signal is the greatest.

In the optical modulator of the present invention, the "optical modulation unit" means a minimum unit in which one Mach-Zehnder type optical waveguide (for example, one of MZ1 to MZ4) and one modulation electrode (one of E1 to E4) for modulating the light wave propagating through the Mach-Zehnder type optical waveguide are combined to realize a modulation function. In FIG. 2, the length of an interaction portion (an electrode portion in which the electric field formed by the electrode has a modulation effect on the light wave propagating through the optical waveguide) of the signal electrode of the modulation electrode is only schematically shown. In practice, however, the modulation electrode is configured to include a signal electrode and a ground electrode, and a wiring portion for introducing or extracting the modulation signal to or from the interaction portion is further present.

The substrate on which the optical waveguides or the modulation electrodes are formed is a ferroelectric substrate. For example, ferroelectric materials, such as a lithium niobate, lithium tantalate, PLZT (lead lanthanum zirconate titanate), materials that belong to quartz or the like, and a combination of these materials may be used. In particular, lithium niobate (LN) crystal or lithium tantalate (LT) crystal having a high electro-optical effect is preferably used.

The optical waveguide may be formed using a method of forming a ridge on a substrate, a method of adjusting the refractive index of a part of the substrate, or a method based on the combination of both the methods. In the ridge type waveguide, in order to leave a substrate portion that forms an optical waveguide, other portions are mechanically cut or are removed by performing etching chemically. In addition, it is also possible to form grooves on both sides of the optical waveguide. In the method of adjusting the refractive index, using a thermal diffusion method of Ti or the like, a proton exchange method, and the like, the refractive index of a part of the substrate surface corresponding to the optical waveguide is set to be higher than the refractive index of the substrate itself.

The modulation electrode is configured to include a signal electrode (E1 to E4, only a part of are shown), a ground electrode (not shown), and the like. The modulation electrode may be formed by formation of an electrode pattern using Ti and Au, a metal plating, and the like. In addition, a buffer layer, such as $SiO_2$ layer, may be disposed between each electrode and the substrate as necessary. The buffer layer has an effect of preventing the light wave, which propagates through the optical waveguide, from being absorbed or scattered by the modulation electrode. In addition, as the configuration of the buffer layer, a Si film or the like may be included in order to reduce pyroelectric effect of thin plate as necessary.

Features of the optical modulator of the present invention is that the light intensity of output light, which is output from the optical modulation unit including the MZ type optical waveguide and the modulation electrode for modulating the light wave propagating through the MZ type optical waveguide, is adjusted using the following method.

(1) A modulation signal with the same intensity is applied to the modulation electrode of each optical modulation unit (2) A mechanical structure including the modulation electrode of the optical modulation unit is adjusted In addition, an optical modulator based on the multi-level modulation format of $2^n$ value QAM (n is a natural number), such as a 16-QAM signal, can be provided by setting the light intensity such that the amplitude value of the optical output modulated by the modulation signal of the optical modulation unit becomes $½^n$ (n is a natural number) of the maximum amplitude value in other optical modulation units at which the amplitude value of the optical output modulated by the modulation signal is the greatest.

As one of the methods of adjusting the mechanical structure of the optical modulation unit, the length of the modulation electrode (the length of the interaction portion of the modulation electrode or the signal electrode) is set so as to become $\{\cos^{-1}(1-2^{1-n})\}/\pi$ ($\pi$ is a natural number) compared with those of other optical modulation units. That is, it is possible to easily adjust the light intensity ratio just by adjusting the shape (length) of the modulation electrode at the time of manufacturing.

Here, the relationship between the light amplitude and $V\pi$ when adjusting the light intensity will be described.

The light waveform P(t) output from the optical modulation unit (MZ type optical waveguide) is expressed by the following expression. Here, Vpp is the amplitude of an RF input signal, P0 is the maximum light amplitude, and $\omega m$ is the angular frequency of an input signal.

$$P(t) = \frac{1}{2}P_0\left[1 - \cos\left(\frac{\pi V_{pp}}{2V_\pi}\sin\omega_m t\right)\right] \quad \text{[Expression 1]}$$

The above-described expression shows a light waveform when the bias point is matched to the null point (zero point, bottom of the modulation curve). A BPSK signal can be obtained if Vpp is lower than $2V\pi$ when operating at this bias point. The light amplitude P of this signal is as follows.

$$P = \frac{1}{2}P_0\left[1 - \cos\left(\frac{\pi V_{pp}}{2V_\pi}\right)\right] \rightarrow V_\pi = \frac{\pi V_{pp}}{2\cos^{-1}\left(1 - 2\frac{P}{P_0}\right)} \quad \text{[Expression 2]}$$

The above expression is the relationship between the light amplitude and $V\pi$, and it can be seen that the light amplitude can be set using $V\pi$ as a parameter. In particular, assuming that the light amplitude is 1 when $V\pi$=0.5 Vpp, it is preferable to set $V\pi$=Vpp in order to obtain the light amplitude of 0.5 and set $V\pi$=1.5 Vpp in order to obtain the light amplitude of 0.25. That is, since the relationship between the electrode length and $V\pi$ is an inversely proportional relationship, it is preferable to set the ratio of the electrode lengths to 2:1 in a portion where the light amplitude ratio needs to be set to 2:1 in the above-described configuration.

As another method of adjusting the mechanical structure of the optical modulation unit, any of the depth of the ridge that forms an optical waveguide, the width of the signal electrode that forms a modulation electrode or a gap between the signal electrode and the ground electrode, or the positional relationship between the modulation electrode and the optical waveguide is adjusted for each optical modulation unit. Also by such an adjustment method, it is possible to easily adjust the intensity ratio just by adjusting the shape and arrangement of the optical waveguide or the modulation electrode when manufacturing the optical modulator.

In order to adjust the intensity of optical output from the optical modulation unit, it is preferable to adjust $V\pi$ (change in refractive index) in each MZ type optical waveguide. When the length of the interaction portion in the modulation electrode is the same in all optical modulation units, it is possible to adjust the light intensity for each optical modulation unit by adjusting the efficiency of the electric field applied to the optical waveguide in the interaction portion.

As a factor that changes the efficiency of the electric field applied to the optical waveguide, when forming a ridge on one side or both sides of the optical waveguide, the intensity of the electric field applied to the optical waveguide can be changed by changing the depth of the ridge. In addition, the intensity of the electric field applied to the optical waveguide may also be changed by adjusting the width of the signal electrode (Hot electrode) that forms the modulation electrode, the gap between the signal electrode and the ground electrode, or the positional relationship between the modulation electrode and the optical waveguide (adjustment to make both the components closer to or away from each other). In addition, the overlapping degree of light and electric field intensity can be changed by adjusting the width of the optical waveguide.

In addition, in the case of using a Z-cut type substrate of lithium niobate, $V\pi$ may also be adjusted by introducing a polarization inversion structure in a part of one branch waveguide of the MZ type optical waveguide. In addition, when a substrate (for example, a substrate such as lithium niobate) of the MZ type optical waveguide portion is made thin (when the entire substrate or the vicinity of the optical waveguide is made thin), a dielectric constant differs according to the thickness of the substrate or the state under the substrate (an air layer in the processed state, adhesive filled after forming the dielectric film from the substrate side and processing the dielectric film). As a result, Vπ is different even for the same electric field intensity.

Thus, it is possible to easily adjust the light intensity ratio in the optical modulator by adjusting the mechanical structure of the optical modulation unit. In particular, a light intensity adjusting mechanism such as an attenuator, adjusting the branching ratio in a branching portion of optical waveguide, adjusting the amplitude ratio of modulation signals in an external circuit, and the like are not necessary unlike the related art. For this reason, since there is no addition or almost no addition of a new component, miniaturization or integration of elements can be realized. As a result, since it becomes less influenced by manufacturing deviation, a stable yield can be expected. In addition, since the amplitude of an RF signal input to the optical modulator can be constant, an adjustment unit on the input signal is not necessary.

The following explanation regarding the optical modulator of the present invention will be focused on 16-QAM. FIG. 2 is an optical modulator having a structure where two MZ type optical waveguides (MZ1 and MZ2, MZ3 and MZ4) are disposed in a nested structure and two QPSK structures are formed. Each of QPSK structure is configured such that optical outputs from the respective Mach-Zehnder type optical waveguides are combined so as to have a phase difference of ±π/2, are disposed in parallel. By appropriately setting Vπ in the optical modulation unit including the MZ type optical waveguide, a BPSK signal optical output with a light amplitude corresponding to each Vπ can be obtained even when an RF signal with the same amplitude is input to each optical modulation unit. In this case, the bias point is set at the null point (zero point), and the maximum amplitude of the RF signal input is up to twice the maximum Vπ.

Four optical modulation units (optical modulation units including any of MZ1 to MZ4) are disposed in parallel to form a QAM structure having a nested structure. Two Mach-Zehnder type optical waveguides (MZ1 and MZ2, MZ3 and MZ4) are disposed in a nested structure and two QPSK structures are formed. Each of QPSK structure is configured such that optical outputs from the respective Mach-Zehnder type optical waveguides are combined so as to have a phase difference of ±π/2. Two QPSK structures are disposed in parallel, and the ratio of the half-wave voltages in the first QPSK structure (structure including MZ1 and MZ2) and the second QPSK structure (structure including MZ3 and MZ4) is set to 1:2. As a result, since the amplitude ratio of the optical outputs in the first and second QPSK structures becomes 2:1, it is possible to generate a 16-QAM optical signal by combining the optical outputs from the two QPSK structures so as to have a phase difference of 0 or π.

In order to set the ratio of the half-wave voltages (Vπ) to 1:2, the length (length of the interaction portion) of the modulation electrode (signal electrode; E1 and E2) provided corresponding to each MZ type optical waveguide (MZ1 and MZ2) in the first QPSK structure is set to 2L, and the length (length of the interaction portion) of the modulation electrode (signal electrode; E3 and E4) provided corresponding to each MZ type optical waveguide (MZ3 and MZ4) in the second QPSK structure is set to L in FIG. 2. Thus, a configuration is adopted in which the ratio of the electrode length related to MZ1 and MZ2 and the electrode length related to MZ3 and MZ4 is 2:1. In addition, if the RF signal with the same amplitude is input to each electrode, the amplitude of the optical output of the first QPSK structure becomes twice that of the second QPSK structure. Accordingly, since it is possible to make the light amplitude asymmetrical without a new light intensity adjusting unit, a 16-QAM signal can be generated.

Figure 3:
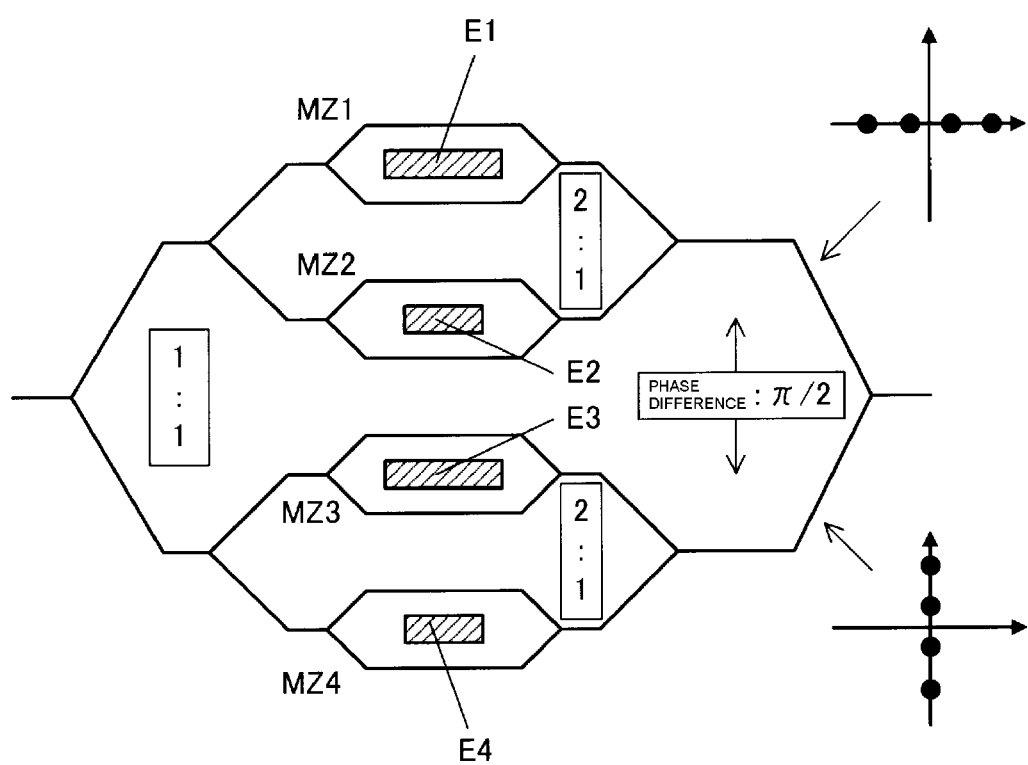
FIG. 3 is a diagram showing the outline of an optical modulator of the present invention. In particular.

In FIG. 3, four optical modulation units (optical modulation units including any of MZ1 to MZ4) are disposed in parallel to form a QAM structure having a nested structure, two Mach-Zehnder type optical waveguides (MZ1 and MZ2, MZ3 and MZ4) are disposed in a nested structure, the amplitude ratio of the optical outputs from the two Mach-Zehnder type optical waveguides (MZ1 and MZ2 or MZ3 and MZ4) is 2:1, two ASK structures (structures including MZ1 and MZ2 or structures including MZ3 and MZ4), each of which is configured such that the optical outputs from the two Mach-Zehnder type optical waveguides are combined so as to have a phase difference of 0 or π, are disposed in parallel, and a 16-QAM optical signal is generated by combining the optical outputs from the two ASK structures so as to have a phase difference of ±π/2.

In order to set the amplitude ratio of the optical outputs to 2:1, two optical modulation units that form each ASK structure shown in FIG. 3 are configured such that the ratio of the electrode length related to MZ1 and the electrode length related to MZ2 (ratio of the electrode length related to MZ3 and the electrode length related to MZ4) becomes 2:1.

Figure 12:
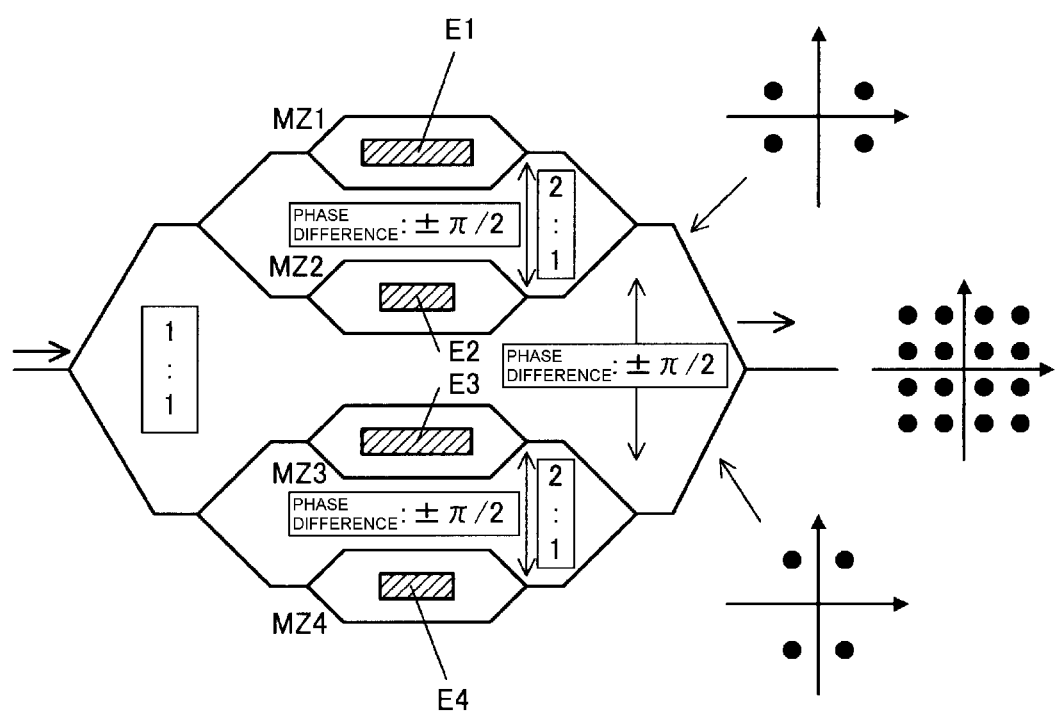
FIG. 12 is a diagram illustrating an optical modulator that generates other 16-QAM optical signals.

FIG. 12 shows another example of the optical modulator that generates the 16-QAM optical signal. Four optical modulation units (optical modulation units including any of MZ1 to MZ4) are disposed in parallel to form a QAM structure having a nested structure, two Mach-Zehnder type optical waveguides (MZ1 and MZ2, MZ3 and MZ4) in which the ratio of half-wave voltages is 1:2 are disposed in a nested structure, the amplitude ratio of the optical outputs from the two Mach-Zehnder type optical waveguides (MZ1 and MZ2 or MZ3 and MZ4) is 2:1, two structures (structures including MZ1 and MZ2 or structures including MZ3 and MZ4), each of which is configured such that the optical outputs from the two Mach-Zehnder type optical waveguides are combined so as to have a phase difference of ±π/2, are disposed in parallel, and a 16-QAM optical signal is generated by combining the optical outputs from the two structures (structures including MZ1 and MZ2 or structures including MZ3 and MZ4) so as to have a phase difference of ±π/2.

In order to set the amplitude ratio of the optical outputs to 2:1, two optical modulation units that form each structure (structure including MZ1 and MZ2 or structure including MZ3 and MZ4) shown in FIG. 12 are configured such that the ratio of the electrode length related to MZ1 and the electrode length related to MZ2 (ratio of the electrode length related to MZ3 and the electrode length related to MZ4) becomes 2:1.

Figure 4:
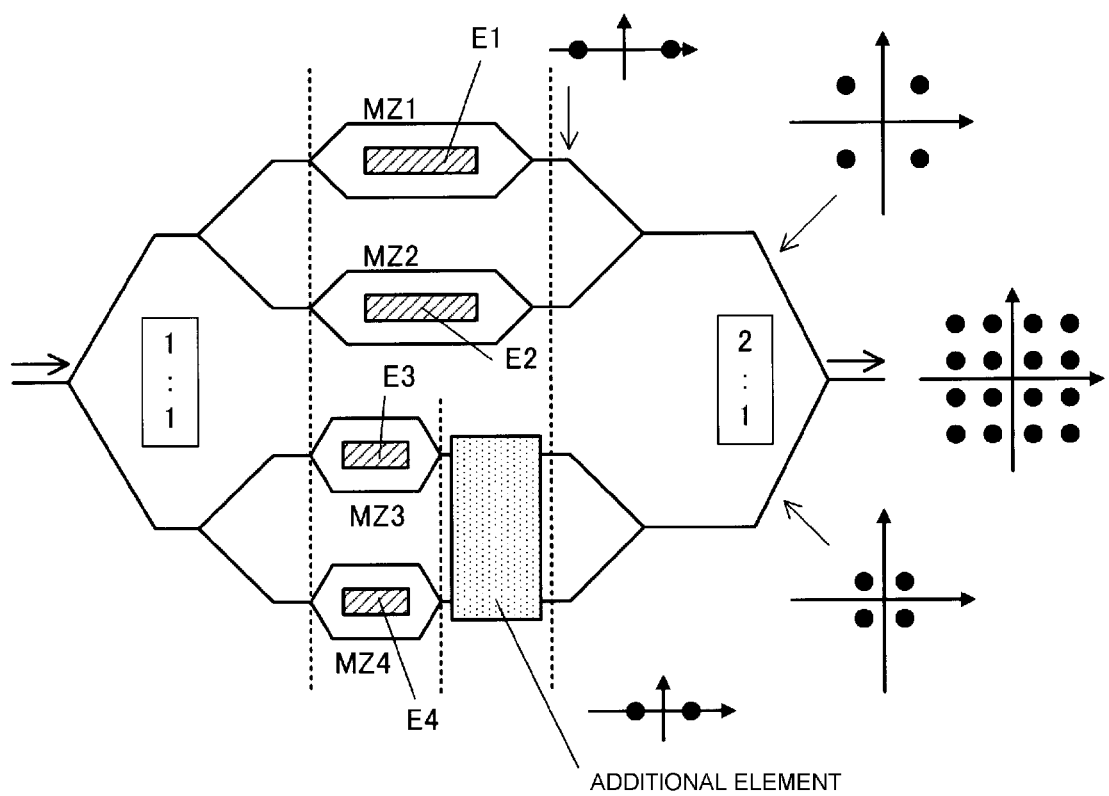
FIG. 4 is a diagram showing an optical modulator of the present invention, and is a diagram illustrating an example where an additional element is disposed.
Figure 5:
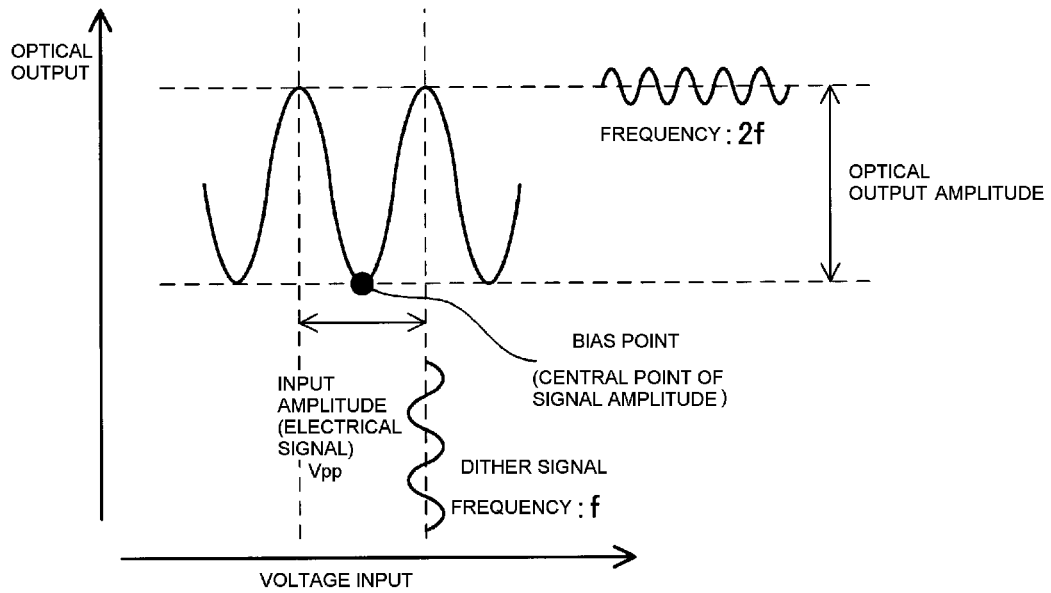
FIG. 5 is a diagram illustrating a conventional example related to the bias control of the optical modulator.
Figure 6:
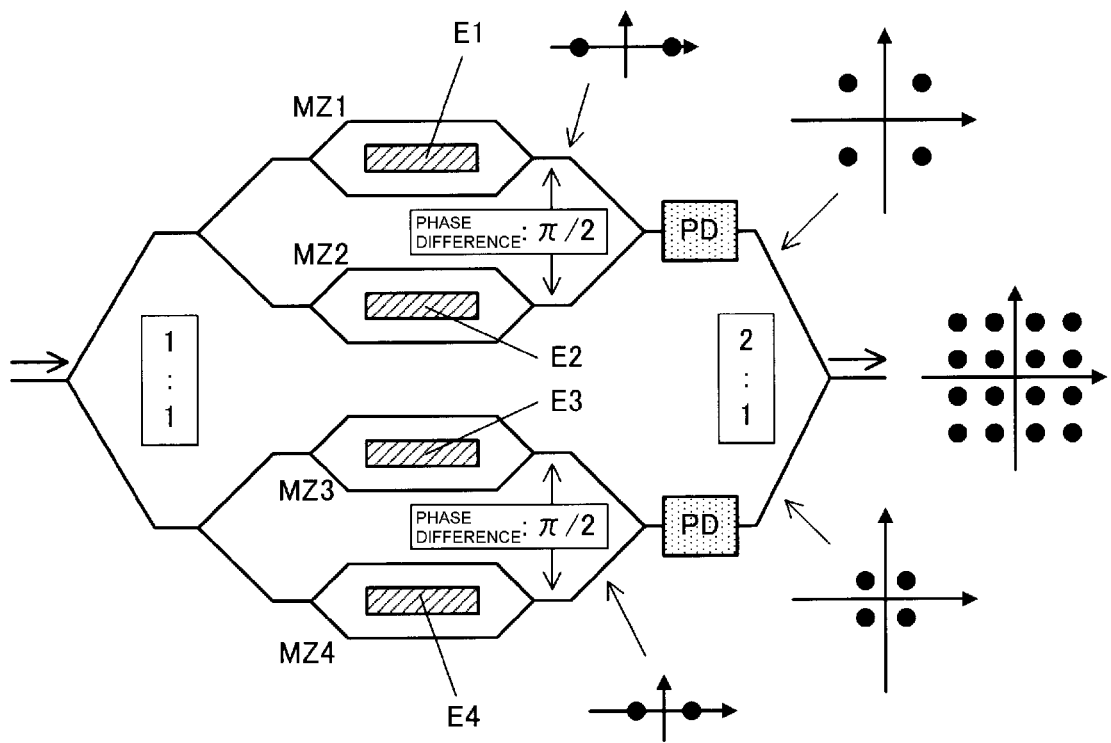
FIG. 6 is a diagram illustrating an example where a photodetector corresponding to the output from each QPSK structure is disposed.
Figure 7:
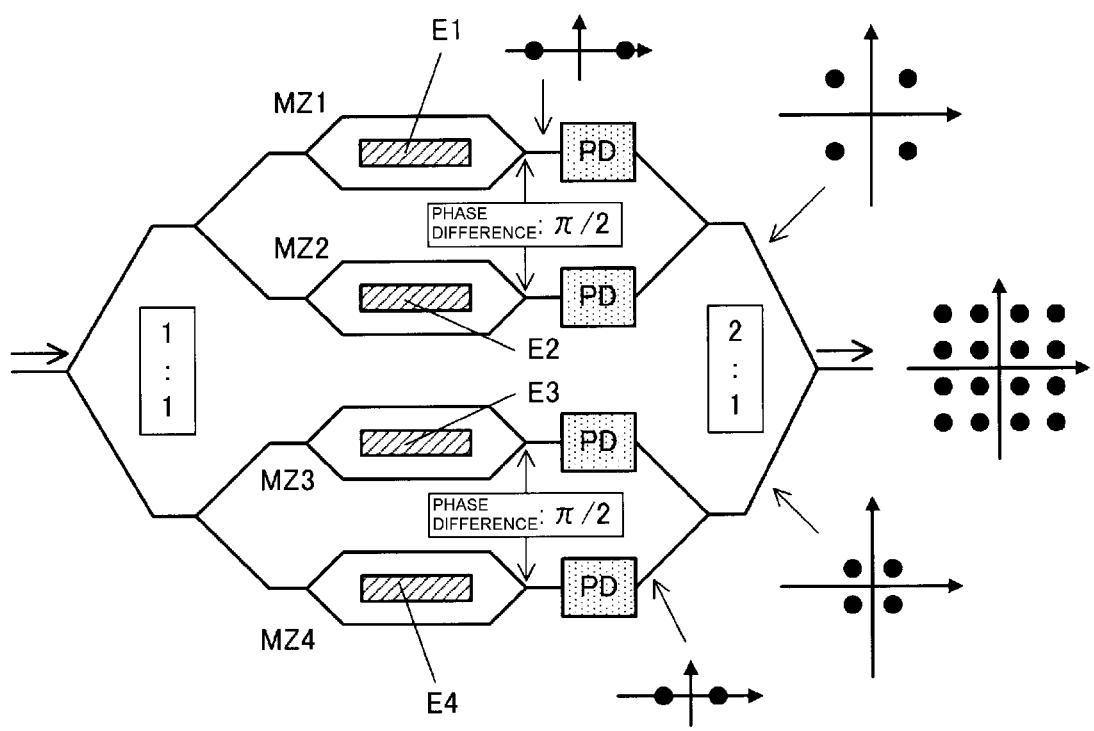
FIG. 7 is a diagram illustrating an example where photodetectors corresponding to the outputs from all MZ type optical waveguides are disposed.

In the optical modulator of the present invention, an extra length (space on the left side of MZ3 and MZ4 shown in FIG. 4) is generated for each of the MZ type optical waveguides disposed in parallel, for example, by the amount corresponding to the asymmetrical electrode length as described above, for example. By using the location, a monitor photodetector (PD) or a bias adjustment electrode can be added as an additional element without increasing the element length.

In addition, it is also possible to change Vπ by arranging a plurality of signal electrodes for one MZ type optical waveguide and inputting a signal to one or a plurality of signal electrodes so that the effective electrode length applied to the MZ type optical waveguide can be selected. If this driving method is used, it is possible to meet not only the QAM scheme but also the multi-modulation format.

In the above explanation, the 16-QAM has been described. However, for example, even in a case where "2(n+1)" optical modulation units that generates a BPSK signal are disposed in parallel, "$4^{n+1}$" QAM modulators may be provided by adjusting the mechanical structure of each optical modulation unit so as to satisfy the following conditions.

For an optical modulation unit in which the amplitude ratio of each optical output is $\frac{1}{2}^0:\frac{1}{2}^1:\ldots:\frac{1}{2}^n$ (n is a natural number) when the ratio of each half-wave voltage of the optical modulation unit is $[\pi/\{\cos^{-1}(1-2^{1-0})\}]:[\pi/\{\cos^{-1}(1-2^{1-1})\}]:\ldots:[\pi/\{\cos^{-1}(1-2^{1-n})\}]$, the mechanical structure of each optical modulation unit is adjusted and set. By adopting a structure where "2(n+1)" optical modulation units are disposed in parallel and combining the optical outputs such that the phase difference between the optical outputs from optical modulation units having the same half-wave voltage is $\pm\pi/2$ and the phase difference of the optical outputs from optical modulation units having different half-wave voltages is $\pi/2 \times m$ (m is an integer), it is possible to generate "$4^{n+1}$" QAM optical signals.

Figure 8:
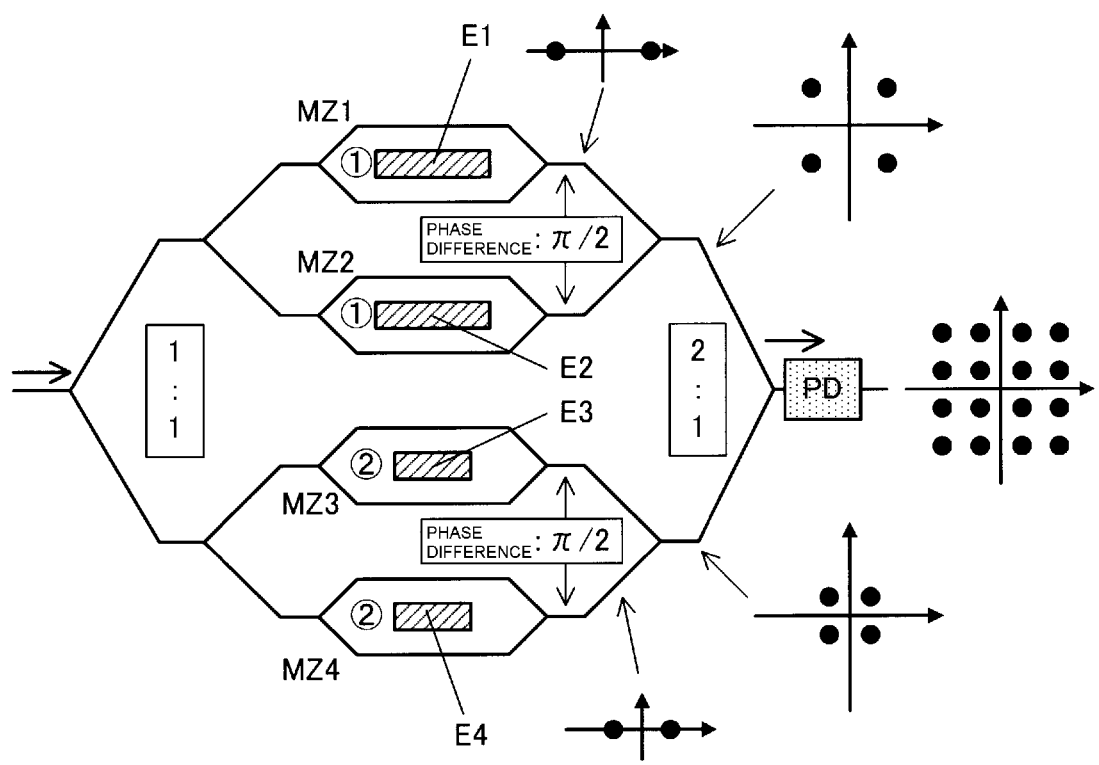
FIG. 8 is a diagram illustrating an example where one photodetector is disposed in the optical modulator of the present invention.

Next, bias control used in the optical modulator of the present invention will be described. FIG. 8 is a diagram where a photodetector (PD) is provided in the optical modulator shown in FIG. 2. In the optical modulator shown in FIG. 8, the mechanical structure of each optical modulation unit is set such that the length of the modulation electrode E1 or E2 of the MZ1 or MZ2 becomes twice the length of the modulation electrode E3 or E4 of the MZ3 or MZ4. In addition, the photodetector (PD) is configured to receive some of the output light, which is output from the optical modulator, and radiation light, which is emitted from a last combining section.

Figure 9:
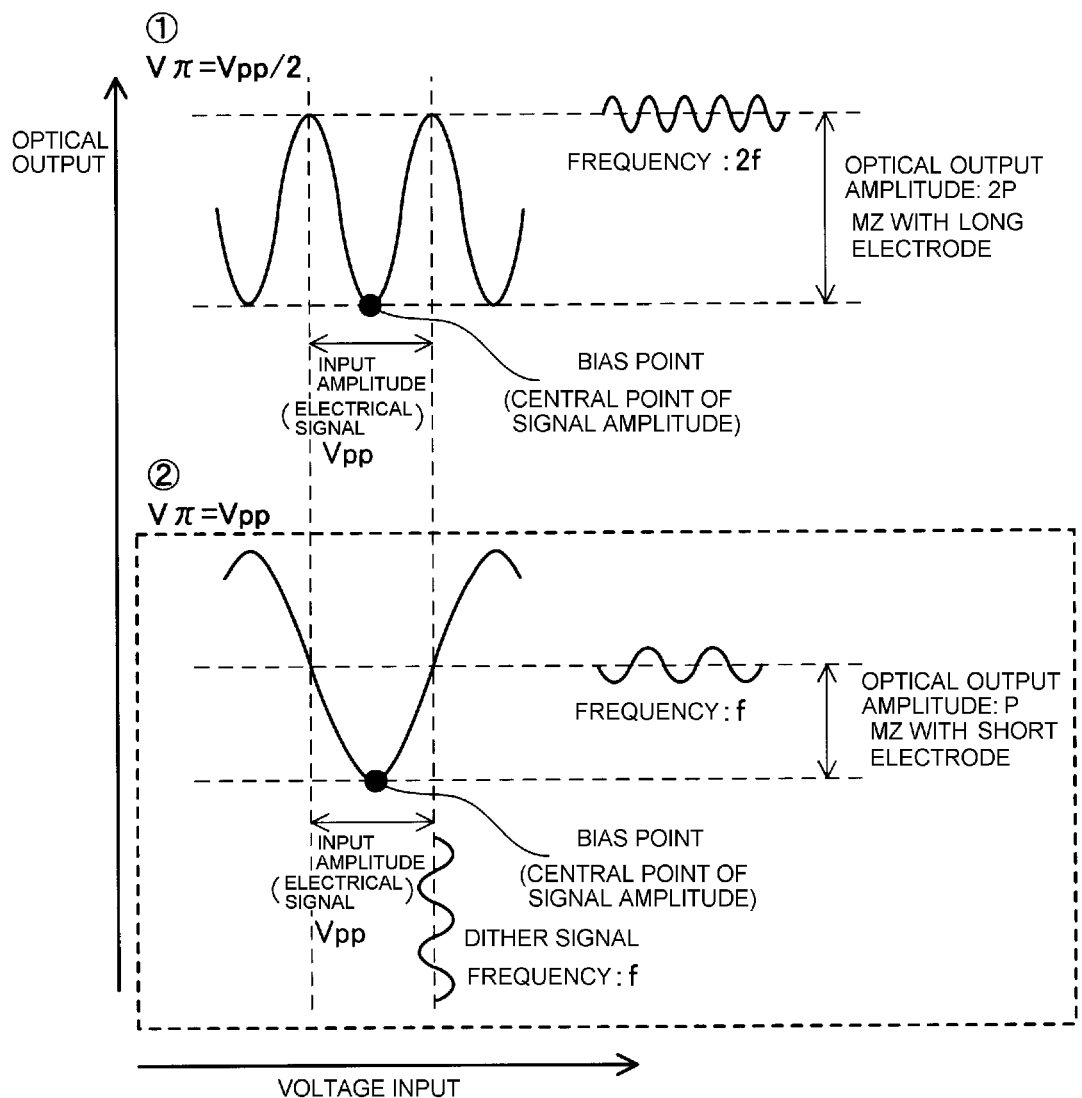
FIG. 9 is a diagram illustrating a bias control method in the optical modulator of the present invention.
Figure 10:
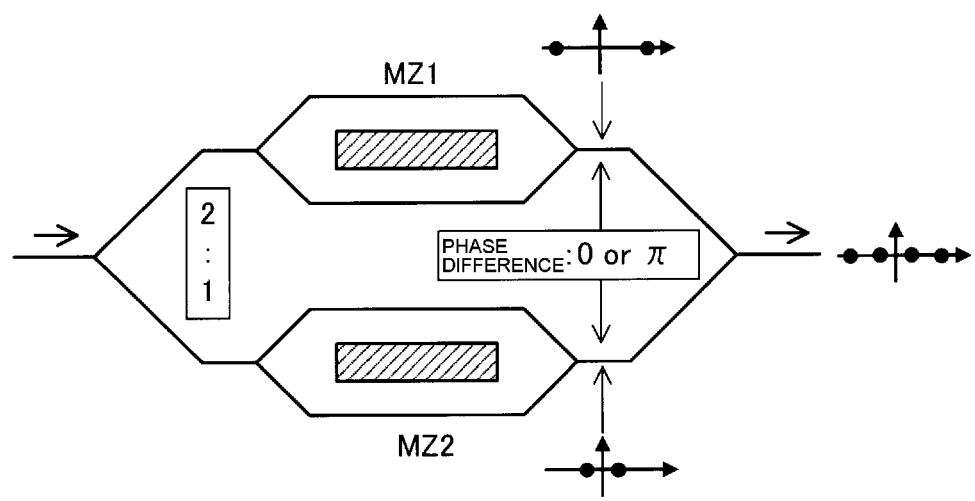
FIG. 10 is a diagram illustrating an optical modulation unit that generates the four-level ASK signal.
Figure 11:
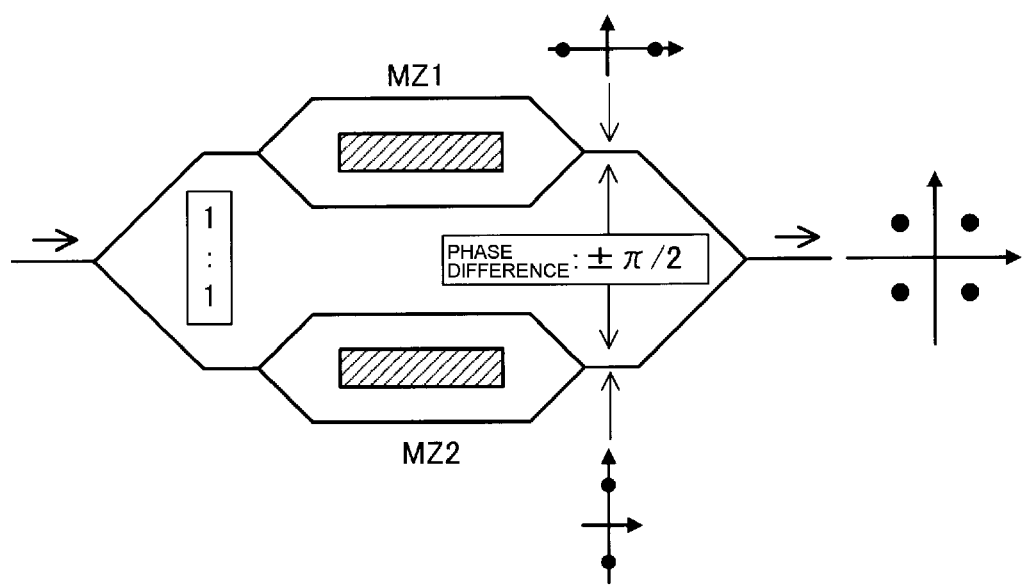
FIG. 11 is a diagram illustrating an optical modulation unit that generates a QPSK signal.

When controlling bias voltage, dither signals with the same frequency f are input to two (for example, MZ1 and MZ3 or MZ1 and MZ4) of the optical modulation units having different mechanical structures, as shown in FIG. 9. For one optical modulation unit ($V\pi=Vpp/2$, an optical modulation unit related to MZ1 or MZ2 in FIG. 8), the bias voltage of the optical modulation unit is controlled on the basis of a component with a frequency 2f included in the output light or radiation light from the optical modulation unit. For the other optical modulation unit ($V\pi=Vpp$, an optical modulation unit related to MZ3 or MZ4 in FIG. 8), the bias voltage of the optical modulation unit is controlled on the basis of a component with a frequency f included in the output light or radiation light from the optical modulation unit. When the bias point is accurate, the component with a frequency 2f included in the output light or radiation light from the former optical modulation unit is greatest, and the component with a frequency f included in the output light or radiation light from the latter optical modulation unit is the greatest.

Thus, even when the dither signal is simultaneously applied to two optical modulation units having different mechanical structures, it is possible to control the bias of the two optical modulation units simultaneously by separately detecting the components with the frequencies f and 2f from the optical signal detected by the photodetector PD shown in FIG. 8. As a result, it is possible to control bias voltage of all optical modulation units simultaneously with the number of the frequency f which is less than the number of optical modulation units. Undoubtedly, it is also possible to use a dither signal with the same frequency f for a plurality of optical modulation units in a time-sharing manner. By using such a technique together, it is possible to perform bias control of all optical modulation units with the number of the frequency f which is half the number of optical modulation units or less.

In addition, although the 16-QAM format is described in FIG. 9, the above-described bias control can also be applied to cases of the QAM format of other $2^n$ values (n is a natural number).

The component of the frequency f of the optical output is also changed by variations in the input amplitude. In this case, it is also possible to control both the input amplitude and the bias point by using the component of f.

In addition, in the optical modulator, dither signals with the same frequency f can be input to two of the optical modulation units having different mechanical structures, and the bias voltage of each of the two optical modulation units can be controlled. The ratio of the half-wave voltages of the two optical modulation units is 1:x ($x \geq 1$). In the former optical modulation unit of the above ratio, the amplitude of the input signal to the optical modulation unit is twice the half-wave voltage, and the bias voltage of the optical modulation unit is controlled by using a component with a frequency 2f included in the output light or radiation light from the optical modulation unit. In the latter optical modulation unit of the above ratio, the bias voltage of the optical modulation unit is controlled by using a component with a frequency f included in the output light or radiation light from the modulation unit. In this manner, it is possible to control bias voltage of all modulation units simultaneously with the number of the frequency f which is less than the number of optical modulation units.

INDUSTRIAL APPLICABILITY

As described above, according to the present invention, it is possible to provide an optical modulator that includes a plurality of optical modulation units having MZ type optical waveguides and can easily adjust the light intensity ratio even though the optical modulator is operable in the QAM format of $2^n$ values (n is a natural number). In addition, it is possible to provide an optical modulator capable of suppressing the number of frequencies of the dither signal applied to the optical modulation units in bias control of each optical modulation unit.

REFERENCE SIGNS LIST

MZ1 to MZ4: Mach-Zehnder type optical waveguide
E1 to E4: modulation electrode (signal electrode)

The invention claimed is:

1. An optical modulator comprising:
an optical modulation unit having a Mach-Zehnder type optical waveguide and a modulation electrode for modulating light waves propagating through the Mach-Zehnder type optical waveguide, wherein
the entire optical waveguide is formed such that a plurality of the optical modulation units are disposed in parallel on the same substrate, one input waveguide branches off to be connected to the Mach-Zehnder type optical waveguide of each optical modulation unit, and outputs from the Mach-Zehnder type optical waveguides are combined and are output through one output waveguide,
a modulation signal with a same intensity is applied to a modulation electrode of each optical modulation unit, and
in at least some of the optical modulation units, a length ratio of the modulation electrode is $\{\cos^{-1}(1-2^{1-n})\}/\pi$ (n is a natural number) compared with those of other optical modulation units such that an amplitude value of an optical output modulated by the modulation signal of the optical modulation unit is $\frac{1}{2}^n$ (n is a natural number) of a maximum amplitude value in other optical modulation units at which an amplitude value of the optical output modulated by the modulation signals is the greatest.

2. The optical modulator according to claim 1,
wherein four optical modulation units are disposed in parallel to form a QAM structure having a nested structure,
two Mach-Zehnder type optical waveguides are disposed in a nested structure,
two QPSK structures, each of which is configured such that optical outputs from the respective Mach-Zehnder type optical waveguides are combined so as to have a phase difference of ±π/2, are disposed in parallel,
a ratio between a half-wave voltage in each optical modulation unit within a first QPSK structure and a half-wave voltage in each optical modulation unit within a second QPSK structure is 1:2,
an amplitude ratio of optical outputs between the first and second QPSK structures is 2:1, and
a 16-QAM optical signal is generated by combining optical outputs from the two QPSK structures so as to have a phase difference of 0 or π.

3. The optical modulator according to claim 1,
wherein four optical modulation units are disposed in parallel to form a QAM structure having a nested structure,
two Mach-Zehnder type optical waveguides between which a ratio of half-wave voltages is 1:2 are disposed in a nested structure,
an amplitude ratio of optical outputs from two Mach-Zehnder type optical waveguides is 2:1,
two ASK structures, each of which is configured such that the optical outputs from the two Mach-Zehnder type optical waveguides are combined so as to have a phase difference of 0 or π, are disposed in parallel, and
a 16-QAM optical signal is generated by combining optical outputs from the two ASK structures so as to have a phase difference of ±π/2.

4. The optical modulator according to claim 1,
wherein four optical modulation units are disposed in parallel to form a QAM structure having a nested structure,
two Mach-Zehnder type optical waveguides between which a ratio of half-wave voltages is 1:2 are disposed in a nested structure,
an amplitude ratio of optical outputs from two Mach-Zehnder type optical waveguides is 2:1,
two structures, each of which is configured such that the optical outputs from the two Mach-Zehnder type optical waveguides are combined so as to have a phase difference of ±π/2, are disposed in parallel, and
a 16-QAM optical signal is generated by combining optical outputs from the two structures so as to have a phase difference of ±π/2.

5. The optical modulator according to claim 1,
wherein dither signals with a same frequency f are input to two of the optical modulation units having the different mechanical structures,
a bias voltage of each of the two optical modulation units is controlled,
a ratio of half-wave voltages between the two optical modulation units is 1:2,
in the former optical modulation unit of the above ratio, the bias voltage of the optical modulation unit is controlled by using a component of a frequency 2f included in an output light or a radiation light from the optical modulation unit, and
in the latter optical modulation unit of the above ratio, a bias voltage of the optical modulation unit is controlled by using a component of the frequency f included in an output light or a radiation light from the optical modulation unit.

6. The optical modulator according to claim 2,
wherein dither signals with a same frequency f are input to two of the optical modulation units having the different mechanical structures,
a bias voltage of each of the two optical modulation units is controlled,
a ratio of half-wave voltages between the two optical modulation units is 1:2,
in the former optical modulation unit of the above ratio, the bias voltage of the optical modulation unit is controlled by using a component of a frequency 2f included in an output light or a radiation light from the optical modulation unit, and
in the latter optical modulation unit of the above ratio, a bias voltage of the optical modulation unit is controlled by using a component of the frequency f included in an output light or a radiation light from the optical modulation unit.

7. The optical modulator according to claim 1,
wherein the optical modulation unit is an optical modulation unit in which an amplitude ratio of each optical output is $½^0:½^1:\ldots:½^n$ (n is a natural number) when a ratio of each half-wave voltage is
$[\pi/\{\cos^{-1}(1-2^{1-0})\}]:[\pi/\{\cos^{-1}(1-2^{1-1})\}]:\ldots:[\pi/\{\cos^{-1}(1-2^{1-n})\}]$,
a structure is adopted in which "2(n+1)" optical modulation units having the same half-wave voltage are disposed in parallel two by two, and
"$4^{n+1}$" QAM optical signals are generated by adopting a configuration in which a phase difference between optical outputs from optical modulation units having the same half-wave voltage is ±π/2 and a phase difference between optical outputs from optical modulation units having different half-wave voltages is π/2×m (m is an integer).

8. The optical modulator according to claim 1,
wherein dither signals with a same frequency f are input to two of the optical modulation units having the different mechanical structures,
a bias voltage of each of the two optical modulation units is controlled,
a ratio of half-wave voltages between the two optical modulation units is 1:x(x≥1),
in the former optical modulation unit of the above ratio, an amplitude of an input signal to the optical modulation unit is twice the half-wave voltage, and the bias voltage of the optical modulation unit is controlled by using a component of a frequency 2f included in an output light or a radiation light from the optical modulation unit, and
in the latter optical modulation unit of the above ratio, the bias voltage of the optical modulation unit is controlled by using a component of a frequency f included in an output light or a radiation light from the optical modulation unit.

9. The optical modulator according to claim 7,
wherein dither signals with a same frequency f are input to two of the optical modulation units having the different mechanical structures,
a bias voltage of each of the two optical modulation units is controlled,
a ratio of half-wave voltages between the two optical modulation units is 1:x(x≥1),
in the former optical modulation unit of the above ratio, an amplitude of an input signal to the optical modulation unit is twice the half-wave voltage, and the bias voltage of the optical modulation unit is controlled by using a component of a frequency 2f included in an output light or a radiation light from the optical modulation unit, and in the latter optical modulation unit of the above ratio, the bias voltage of the optical modulation unit is controlled by using a component of a frequency f included in an output light or a radiation light from the optical modulation unit.

* * * * *